(12) United States Patent
Kostic et al.

(10) Patent No.: US 8,671,046 B2
(45) Date of Patent: *Mar. 11, 2014

(54) SYSTEM FOR BUYING AND SELLING CLICK-THROUGH TRAFFIC ON INTERNET WEB SITES

(76) Inventors: Miodrag Kostic, Honolulu, HI (US); Guy Vandevelde, Ghent (BE)

( * ) Notice: Subject to any disclaimer, the term of this patent is extended or adjusted under 35 U.S.C. 154(b) by 3288 days.

This patent is subject to a terminal disclaimer.

(21) Appl. No.: 10/096,132

(22) Filed: Mar. 7, 2002

(65) Prior Publication Data

US 2002/0128959 A1 Sep. 12, 2002

Related U.S. Application Data

(60) Provisional application No. 60/274,604, filed on Mar. 9, 2001, provisional application No. 60/302,863, filed on Jul. 3, 2001.

(51) Int. Cl.
*G06Q 40/00* (2012.01)
(52) U.S. Cl.
USPC ............................................ 705/37; 715/517
(58) Field of Classification Search
USPC .................................................. 705/14, 26, 37
See application file for complete search history.

(56) References Cited

U.S. PATENT DOCUMENTS

| | | | |
|---|---|---|---|
| 6,907,566 B1 * | 6/2005 | McElfresh et al. | 715/517 |
| 2001/0034646 A1 | 10/2001 | Hoyt et al. | |
| 2001/0056412 A1 | 12/2001 | Kutsuzawa et al. | |
| 2002/0002529 A1 | 1/2002 | Tokiwa et al. | |
| 2002/0032579 A1 | 3/2002 | Harpale | |
| 2003/0093355 A1 * | 5/2003 | Issa | 705/37 |

FOREIGN PATENT DOCUMENTS

| | | |
|---|---|---|
| JP | 01/195466 | 7/2001 |
| JP | 01/344540 | 12/2001 |

* cited by examiner

*Primary Examiner* — Charles Kyle
*Assistant Examiner* — Siegfried E Chencinski
(74) *Attorney, Agent, or Firm* — Leighton K. Chong

(57) ABSTRACT

A system for buying and selling click-through traffic from a seller's web site employs an intermediary web site for conducting a multi-buyer pre-bidding trial of click through traffic so that a plurality of interested buyers can see for themselves what level and quality of traffic is generated to their webs sites. The trial is conducted with each buyer in turn during a trial period prior to opening bidding by the interested buyers for click through traffic from the seller's web site. The trial is conducted by placing a trial link on the seller's web site to the intermediary web site which links to each buyer's web site in turn during the trial period. The intermediary web site measures the click-through traffic during the trial process, so that the participating buyers are informed in real time of the actual performance of click-through traffic.

17 Claims, 37 Drawing Sheets

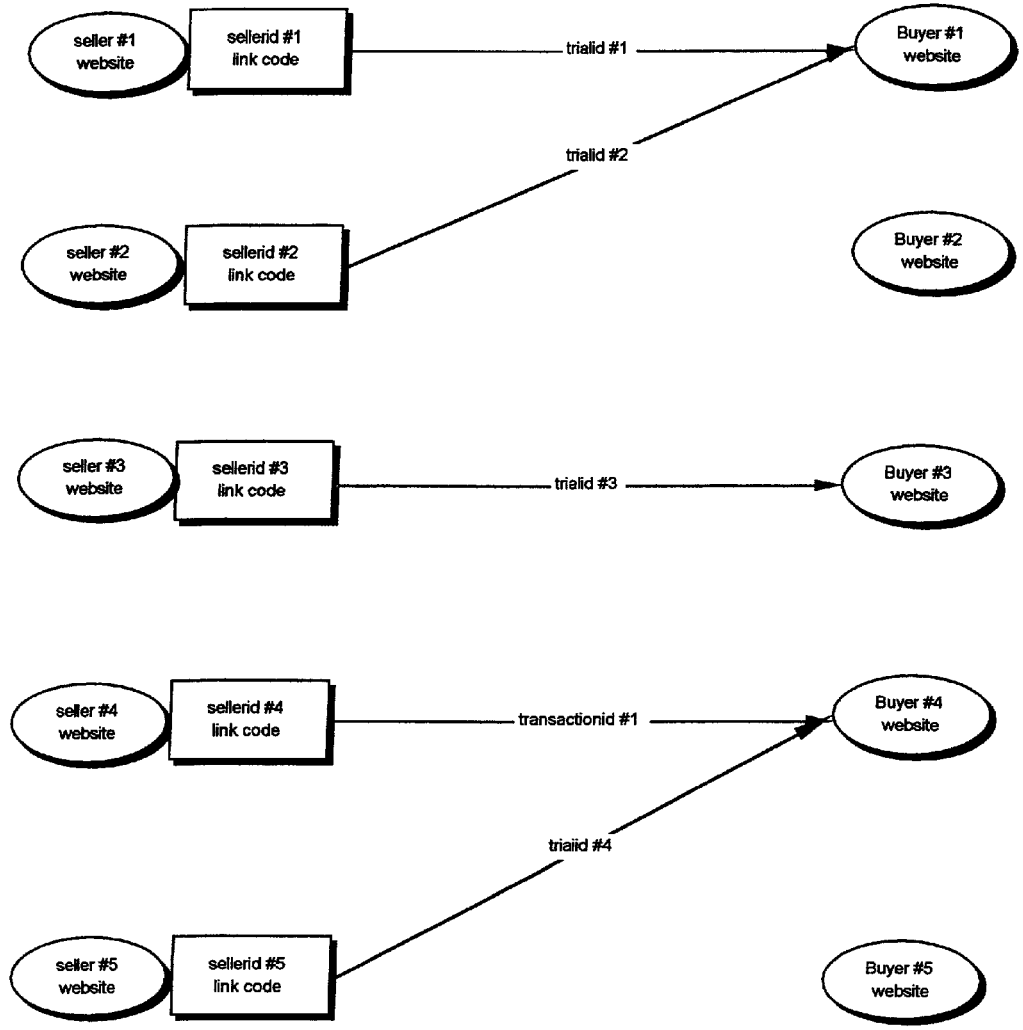

FIG. 7 clicks broker.com | how to buy | how to sell | how to

Buyer websites | Seller websites | Exchange websites | search

... ClicksBroker users today 2/13/2002 : 2 ... User sessions now at 2:49:39 PM : 1

Flash Animation buyer login
Email
Pass.
[ submi ]

buy visitor traffic

Buy visitor traffic directly from websites perfectly suited for your own website - at your price. Our patented automated trial period ensures you will get as many quality visitors as fast as you need them.
How to buy visitor clicks ... from proven source ... click here seller login
Email
Pass
[ submi ]

sell visitor traffic

Sell your visitor traffic directly to the buyer website. Our patented automated trial period ensures you will achieve maximum possible click-through ratio - at the best selling price.
How to sell visitor clicks ... with maximum effect ... click here exchange logir
Email
Pass
[ submi ]

exchange visitors

Exchange visitor traffic with websites perfectly suited for your own website. Our automated trial interaction ensures equal exchange.
How to exchange quality visitor clicks ... equally ... Coming soon Banner 2

FIG. 8

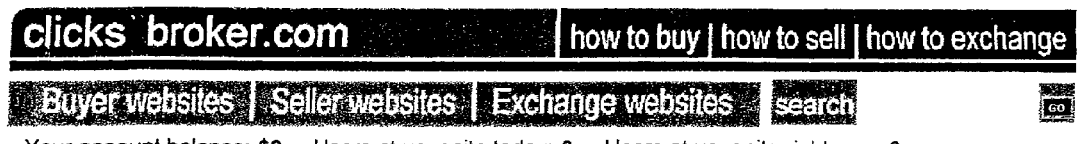

Your account balance: $0 ... Users at your site today: 0 ... Users at your site right now: 0

Site: .. Category:  Mode:
Links: | account | links | code | trial | bidding | selling | reports | affiliate | help |  Id:
Seller Account ... Fill in the info form  Current status:

Your personal information

| | |
|---:|:---|
| Name: | Miodrag Kostic |
| Address: | 1031 Nuuanu Ave 2404 |
| City | Honolulu |
| State: | HI |
| Zip: | 96817 |
| Country: | USA |
| Phone: | 808-528-5570 |

Your login information

| | | |
|---:|:---|:---|
| Email: | mike@web-consulting.com | |
| Password: | | ( min. 5 characters ) |
| Confirm Password: | | |
| Password hint: | tron | ( ie. your dogs name ) |

Your website information

| | |
|---:|:---|
| Link URL: | http://www.web-consulting.com/ |
| Site description: | Tune-it-up to increase your page hits and get more |
| Choose category: | COMPUTERS |

FIG. 9

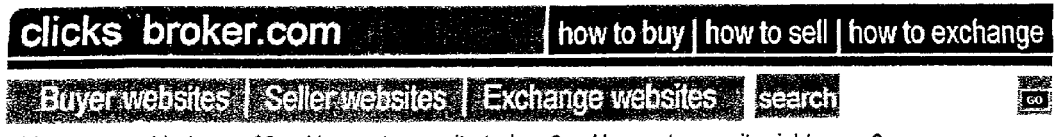

Your account balance: $0 ... Users at your site today: 0 ... Users at your site right now: 0

Site: WWW miodrag kostic website.. Category: COMPUTERS          Mode: Selling

Links: | account | links | code | trial | bidding | selling | reports | affiliate | help |          Id: 1000298

Seller Links ... Your advertising links          Current status: DirectSale Process

... Click here if you wish to customize your ad links yourself

[ Customize links yourself ]

... Or choose text label settings to match your website template

| Link text style | Current settings | Default settings | Change settings |
|---|---|---|---|
| Font type | ' Arial ' | Verdana | Verdana |
| Font color | ' black ' | Black | Black |
| Font size | ' 2 ' | 2 | 2 |
| Label width | ' 0 ' | 0 | 0 |
| Label bkg. color | ' white ' | White | White |
| Label padding | ' 0 ' | 0 | 0 |
| Label border | ' 0 ' | 0 | 0 |

[ Test Settings ]

FIG. 10 clicks broker.com | how to buy | how to sell | how to exchange

Buyer websites | Seller websites | Exchange websites | search

Your account balance: $0 ... Users at your site today: 0 ... Users at your site right now: 0

Site: Tune-it-up to increase your page h.. Category: COMPUTERS     Mode: Affiliate
Links: | account | links | code | trial | bidding | selling | reports | affiliate | help |    Id: 1000313
Seller Code ... Get ClicksBroker code to paste     Current status: ClicksBroker Trial

... Copy and paste code for buyers text messages
(after viewing this page you will need to login again)

Copy and paste text link message No.1:

<u>ClicksBroker.com makes it possible... 1</u>

```
<!-- START CLICKSBROKER CODE -->
<div align="center">
<script language="JavaScript" src="http://localhost/CB/links/1000313_1.js">
</script>
</div>
<!-- END CLICKSBROKER CODE -->
```

Copy and paste text link message No.2:

<u>ClicksBroker.com makes it possible... 1</u>
Looking for a perfect match for your Web site, a site whose link will achieve high click-through ratio and at the same time deliver quality traffic that will convert into revenue...1

```
<!-- START CLICKSBROKER CODE -->
<div align="center">
<script language="JavaScript" src="http://localhost/CB/links/1000313_2.js">
</script>
</div>
<!-- END CLICKSBROKER CODE -->
```

Copy and paste text link message No.3:

<u>ClicksBroker.com makes it possible... 2</u>

```
<!-- START CLICKSBROKER CODE -->
<div align="center">
```

FIG. 11 clicks broker.com | how to buy | how to sell | how to exchange
Buyer websites | Seller websites | Exchange websites | search Your account balance: $0 ... Users at your site today: 0 ... Users at your site right now: 0

Site: Site Promotion Internet Marketing .. Category: COMPUTERS     Mode: Affiliate
Links: | account | links | code | trial | bidding | selling | reports | affiliate | help |     Id: 1000296
Seller Trials ... Your trial activity reports     Current status: Sale Ended

Option 1: Click here to sell directly without trial or bidding
Option 2: Set your bidding preferences below, to go on trial ... Your averige visitors traffic is measured to be 689 visitors/day
(Recommended settings reflect your visitor traffic)

Average settings for your category:
min.clickthrough = 0.00294   min.price.per.click = 0.0035   max.price.per.click = 0.0152

|  | Min. click-through | Min. price per click | Max. price per click | Bidding lenght | Auto bidding |
|---|---|---|---|---|---|
| Your current settings (min / max ... limits) | 0.0001 clicks/hits | $ 0.01 | $ 0.02 | 1 days | no |
| Recommended settings (min / max ... limits) | 0.03 clicks/hits | $0.03 | $0.15 | 6 days | no |
| Accept Settings | 0.01 | 0.01 | 0.20 | 7 | no |

... Definitions

Average click-through = total number of visitor clicks per number of link impressions served Minimum click-through = minimum click-through ratio accepted by seller Your minimum bid = minimum bid amount ($) accepted by seller Your maximum bid = maximum bid amount ($) accepted by seller Bidding lenght = The lenght of bidding process set by seller

FIG. 12 clicks broker.com | how to buy | how to sell | how to exchange

Buyer websites | Seller websites | Exchange websites | search

Your account balance: $0 ... Users at your site today: 0 ... Users at your site right now: 0

Site: Site Promotion Internet Marketing .. Category: COMPUTERS　　　　Mode: Affiliate

Links: | account | links | code | trial | bidding | selling | reports | affiliate | help |　　Id: 1000296

Seller Trials ... Your trial activity reports　　　　　　　　　　Current status: Sale Ended

... List of buyer websites available for trial

| Buyer website | Trial click through | Trial clicks/day record | Buyer needs clicks/day | Buyer max.bid | Choose |
|---|---|---|---|---|---|
| maui goose.. | 0.0314 | 15 | 10 | $0.02 | submit |
| Adcom kiosks.. | 0.0085 | 30 | 10 | $0.3 | submit |
| Our overarching goals .. | 0.0079 | 29 | 10 | $0.08 | submit |
| convenient payment opt.. | 0.0051 | 17 | 100 | $0.07 | submit |

[ Start trial process ]

Or ... Click here to sell directly without trial or bidding

FIG. 13 clicks broker.com | how to buy | how to sell | how to exchange

Buyer websites | Seller websites | Exchange websites | search

Your account balance: $0 ... Users at your site today: 0 ... Users at your site right now: 0

Site: WWW miodrag kostic website.. Category: COMPUTERS Mode: Affiliate
Links: | <u>account</u> | <u>links</u> | <u>code</u> | <u>trial</u> | <u>bidding</u> | <u>selling</u> | <u>reports</u> | <u>affiliate</u> | <u>help</u> | Id: 1000298
Seller Bidding ... Your bidding activity reports Current status: Begin Bidding

Initiate Bidding Process

List of buyers to be invited to bid for your clicks

| Buyer website | Trial cl.through | Trial clicks/day | Buyer clicks/day | Buyer max.bid | Your min.bid |
|---|---|---|---|---|---|
| <u>maui goose..</u> | 0.0123 | 30 | 10 | $0.02 | $0.01 |
| <u>Adcom kiosks..</u> | 0.0085 | 30 | 10 | $0.3 | $0.01 |
| <u>Our overarching goals ..</u> | 0.0079 | 29 | 10 | $0.08 | $0.01 |
| <u>convenient payment opt..</u> | 0.0051 | 17 | 100 | $0.07 | $0.01 |

<u>Click here to start the bidding process</u>

... Definitions

Average click-through = total number of visitor clicks per number of link impressions served Minimum click-through = minimum click-through ratio accepted by seller Your minimum bid = minimum bid amount ($) accepted by seller Your maximum bid = maximum bid amount ($) accepted by seller Bidding lenght = The lenght of bidding process set by seller

FIG. 14

| clicks broker.com | how to buy | how to sell | how to exchange |

| Buyer websites | Seller websites | Exchange websites | search |

Your account balance: $0 ... Users at your site today: 0 ... Users at your site right now: 0

Site: WWW miodrag kostic website.. Category: COMPUTERS     Mode: Affiliate

Links: | account | links | code | trial | bidding | selling | reports | affiliate | help |    Id: 1000298

Seller Bidding ... Your bidding activity reports     Current status: Bidding Process

Bidding Process is ON

Bidding ends on: 2/15/2002 7:53:55 PM

| Buyer website | Trial cl.through | Trial clicks/day | Buyer clicks/day | Buyer max.bid | Current bid | Winning bid | Earning $/hit |
|---|---|---|---|---|---|---|---|
| Adcom kiosks.. | 0.0085 | 30 | 10 | $0.3 | $0.21 | $0.3 | 0.001801 |

... Definitions

Average click-through = total number of visitor clicks per number of link impressions served Minimum click-through = minimum click-through ratio accepted by seller Your minimum bid = minimum bid amount ($) accepted by seller Your maximum bid = maximum bid amount ($) accepted by seller Bidding lenght = The lenght of bidding process set by seller

FIG. 15 clicks broker.com | how to buy | how to sell | how to exchange

Buyer websites | Seller websites | Exchange websites | search

Your account balance: $0 ... Users at your site today: 0 ... Users at your site right now: 0

Site: Site Promotion Internet Marketing .. Category: COMPUTERS        Mode: Selling

Links: | account | links | code | trial | bidding | selling | reports | affiliate | help |     Id: 1000296

Seller Reports ... Your current activity reports        Current status: Sale Process

Your previous selling activity

| Buyer website | Your visitors /day | Sale click through | Sale clicks /day | Clicks sent | Click price | Sale amount | Last click sent |
|---|---|---|---|---|---|---|---|
| maui goose.. | 1196 | 0.8252 | 92 | 987 | $0.05 | $49.35 | 2/13/2002 1:51:40 PM |

... Your account balance is 0 and when it reaches $100 you will receive payment

FIG. 16 clicks broker.com | how to buy | how to sell | how to exchange

Buyer websites | Seller websites | Exchange websites | search

Your account balance: $0 ... Users at your site today: 0 ... Users at your site right now: 0

Site: Site Promotion Internet Marketing .. Category: COMPUTERS     Mode: Selling

Links: | account | links | code | trial | bidding | selling | reports | affiliate | help |    Id: 1000296

Selling ... Your selling activity reports     Current status: Sale Process

... Buyer website you are currently selling to

| Buyer website | Your visitors/day | Sale click through | Sale total clicks | Sale click cost | Choose |
|---|---|---|---|---|---|
| maui goose.. | 92 | 0.0773 | 987 | $0.05 | end sale |

FIG. 17 clicks¨broker.com | how to buy | how to sell | how to exchange

Buyer websites | Seller websites | Exchange websites | search

Your account balance: $0 ... Users at your site today: 0 ... Users at your site right now: 0

Site: Site Promotion Internet Marketing .. Category: COMPUTERS     Mode: Affiliate

Links: | account | links | code | trial | bidding | selling | reports | affiliate | help |    Id: 1000296

Seller Reports ... Your current activity reports     Current status: Sale Ended

Your previous selling activity

| Buyer website | Your visitors /day | Sale click through | Sale clicks /day | Clicks sent | Click price | Sale amount | Last click sent |
|---|---|---|---|---|---|---|---|
| maui goose.. | 1196 | 0.8252 | 92 | 987 | $0.05 | $49.35 | 2/13/2002 1:51:40 PM |

... Your account balance is 0 and when it reaches $100 you will receive payment

FIG. 18

| clicks broker.com | how to buy | how to sell | how to exchange |

| Buyer websites | Seller websites | Exchange websites | search |

Your account balance: $0 ... Users at your site today: 0 ... Users at your site right now: 0

Site: WWW miodrag kostic website.. Category: COMPUTERS　　　　　　　　　Mode:

Links: | account | links | code | trial | bidding | selling | reports | affiliate | help |　　Id: 1000298

Invite Buyer ... Ask Buyer for direct sale with your site　　　　　　　　　Current status:

You are to offer your clicks for direct sale:
　　( NO trial or bidding process )

Your site: WWW miodrag kostic website

Your URL: http://www.catii.com/index.htm

Choose your price per click:

Your price: 0.02

Listed as ALL categories:

Choose: All categories

Submit your direct sale offer

[ Submit direct sale ]

FIG. 19

| clicks broker.com | how to buy | how to sell | how to exchange |
| Buyer websites | Seller websites | Exchange websites | search |

Your account balance: $ 0 ... Clicks received to date: 0 ... Free clicks received: 0

Site: ... Category:  Id:

Links: | account | links | code | trial | bidding | buying | reports | funds | help |

Buyer application... Enter your information  Status: NOT Active

Your personal information

Name: John Smith

Address: 2345 Kalakaua Ave

City Honolulu

State: HI

Zip: 96817

Country: USA

Phone: 808-345-5678

Your login information

Email: j@j.com

Password:  ( min. 5 characters )

Confirm Password:

Password hint: cat  ( ie. your dogs name )

Your website information

Link URL: http://www.adcomkiosk.com/2home.htm

Site description: The classic wood finish of the PowerNet sets a rel

Choose category: COMPUTERS

FIG. 20 clicks broker.com | how to buy | how to sell | how to exchange

Buyer websites | Seller websites | Exchange websites | search

Your account balance: $ 0 ... Clicks received to date: 0 ... Free clicks received: 0

Site: The classic wood finish of the... Category: COMPUTERS　　　　　　　　　Id: 1000041

Links: | account | links | code | trial | bidding | buying | reports | funds | help |

Advertising links... Enter your info　　　　　　　　　　　　　　　　Status: NOT Active

Submit your advertising links information

... Please enter your Web page URL where visitors will be sent

Your target URL:　http://　　http://www.adcomkiosk.com/kiosk.htm

... Please enter your text messages below (minimum one)

Your text message No.1 Title:　　The classic wood finish of the PowerNet sets a relaxed mood, enric Your message No.1 Description:　The classic wood finish of the PowerNet sets a relaxed mood, enric Your text message No.2 Title:

Your message No2 Description:

... Please enter your banner image locations (URLs) below

Banner link No.1 (468X60):　　http://www.adcomkiosk.com/kiosk.htm

Banner link No.2 (468X60):

Banner link No.3 (120X60):

FIG. 21 clicks broker.com | how to buy | how to sell | how to exchange

Buyer websites | Seller websites | Exchange websites | search

Your account balance: $ 0 ... Clicks received to date: 0 ... Free clicks received: 0

Site: The classic wood finish of the... Category: COMPUTERS  Id: 1000041

Links: | account | links | code | trial | bidding | buying | reports | funds | help |

Tracking code... Copy and paste into your pages  Status: NOT Active

IMPORTANT ... You must have tracking code pasted to keep your account active

Copy and paste tracking code (invisible) on all of the pages at your site:
... or for now, to activate your account, only on the page receiveing ClicksBroker visitor traffic
Receiving page URL: http://www.adcomkiosk.com/kiosk.htm

```
<!-- START CLICKSBROKER TRACKING CODE -->
<script language="VB" src="http://127.0.0.1/CB/clicks.aspx?1000041"></script>
<!-- END CLICKSBROKER TRACKING CODE -->
```

Paste the code on your pages and then click below to veryfy the links

NO CODE DETECTED ... Please paste the code on your Web page

[ Verify your link ]

FIG. 22 clicks broker.com | how to buy | how to sell | how to exchange

Buyer websites | Seller websites | Exchange websites | search

Your account balance: $ 0 ... Clicks received to date: *1* ... Free clicks received: 0

Site: *The classic wood finish of the...* Category: COMPUTERS   Id: 1000041

Links: | account | links | code | trial | bidding | buying | reports | funds | help |

Bidding preferences... Enter your info   Status: Active

... Your settings will limit the search for sellers who fit your desired profile
(reccommended settings reflect your desired clicks per day delivery)

Average settings for your category:
min.traffic.quality = 4  min.price.per.click = 0.01  max.price.per.click = 0.1085

|  | Min. traffic quality | Min. clicks per day delivery | Min. price per click | Max. price per click | Auto bidding |
|---|---|---|---|---|---|
| Your current settings (min / max ... limits) | 0 | 0 clicks/day | $ 0 | $ 0 | no |
| Recommended settings (min / max ... limits) | 35 | 200 | $0.01 | $0.07 | no |
| [ Accept Settings ] | 10 | 200 | 0.01 | 0.08 | no |

... Definitions

Traffic quality = ( page hits / unique visitors ) X time spent per unique visitor Min. traffic quality = your minimum setting Min. clicks per day delivery = your minimum setting Min price per click = *your minimum accepted price*

Max price per click = your maximum accepted price

Auto bidding = Bid is entered automatically until ir reaches your max.bid

FIG. 23

| clicks broker.com | how to buy | how to sell | how to exchange |
| Buyer websites | Seller websites | Exchange websites | search |

Your account balance: $ 0 ... Clicks received to date: 1 ... Free clicks received: 0

Site: The classic wood finish of the... Category: COMPUTERS  Id: 1000041

Links: | account | links | code | trial | bidding | buying | reports | funds | help |

Add Funds... Manage your account deposits  Status: Active

Please make initial deposit to your account

... Your current account balance is: $

Enter your credit card info

Deposit amount: 50.00

Credit card No: 5873753583583586

Expiration date: 04/02

[ submit ]

*(When your balance gets below $25 you will be charged $50)*

FIG. 24 clicks broker.com | how to buy | how to sell | how to exchange

Buyer websites | Seller websites | Exchange websites | search

Your account balance: $ 50 ... Clicks received to date: 1 ... Free clicks received: 0

Site: The classic wood finish of the... Category: COMPUTERS    Id: 1000041

Links: | account | links | code | trial | bidding | buying | reports | funds | help |

Invite sellers for trial... Choose compatible sites    Status: Active

... List of seller websites available for trial in your category

| SellerID | Seller website | Seller visitors/day | Seller traff.quality | Seller clicks/day | Seller min.bid | Choose |
|---|---|---|---|---|---|---|
| 1000297 | Web Site Promotion.. | 1899 | 175 | 17 | $0.01 | invite seller |
| 1000298 | WWW miodrag kostic website.. | 3387 | 65 | 17 | $0.01 | invite seller |
| 1000296 | Site Promotion Internet Mar.. | 220 | 39 | 1 | $0.01 | invite seller |
| 1000298 | WWW miodrag kostic website.. | 2432 | 40 | 30 | $0.01 | invite seller |
| 1000295 | Adcom Kiosks.. | 496 | 1 | 15 | $0.01 | invite seller |
| 1000298 | WWW miodrag kostic website.. | 3498 | 108 | 30 | $0.01 | invite seller |
| 1000295 | Adcom Kiosks.. | 541 | 153 | 6 | $0.01 | invite seller |
| 1000296 | Site Promotion Internet Mar.. | 3175 | 100 | 30 | $0.01 | invite seller |

... Definitions

Traffic quality = ( page hits / unique visitors ) X time spent per unique visitor Delivery speed = average number of click-throughs / day (clicks/day)

Seller min. bid = minimum bid accepted by seller

FIG. 25 clicks broker.com | how to buy | how to sell | how to exchange

Buyer websites | Seller websites | Exchange websites | search | GO

Your account balance: $ 50 ... Clicks received to date: 1 ... Free clicks received: 0

Site: The classic wood finish of the... Category: COMPUTERS     Id: 1000041

Links: | account | links | code | trial | bidding | buying | reports | funds | help |

Invite seller for trial... Ask sellers to go on trial with your site     Status: Active

You have selected seller web site:

Sallers site: Web Site Promotion

Sellers URL: http://www.web-consulting.com/clicksbroker.htm

Sellers min. accepted bid: 0.01

Make him a bid offer 0.02 (optional)

Invite seller for trial with your site

[ Invite seller ]

FIG. 26

| clicks broker.com | how to buy | how to sell | how to exchange |

| Buyer websites | Seller websites | Exchange websites | search | GO |

Your account balance: $ 50 ... Clicks received to date: 14 ... Free clicks received: 30

Site: Our overarching goals are to b... Category: COMPUTERS   Id: 1000039

Links: | account | links | code | trial | bidding | buying | reports | funds | help |

Buyer Bidding Reports... Your current bidding activity reports   Status: Active

... Click here to bid for any seller website without a trial. (not recommended)

Seller websites available for bidding

| Seller website | Seller visitors/day | Seller traff.quality | Seller clicks/day | Bidding ends in | Current bid | Enter your bid |
|---|---|---|---|---|---|---|
| WWW miodrag kostic website.. | 3796 | 62 | 29 | 27hours | $0.11 | bid now |

... Definitions

Traffic quality = ( page hits / unique visitors ) X time spent per unique visitor Delivery speed = average number of click-throughs / day (clicks/day)

Current bid = in US dollars per click-through ($/click)

End sale button = click if you want to end the sale process

FIG. 27

Your account balance: $ 49.769 ... Clicks received to date: 40 ... Free clicks received: 180

Site: maui goose... Category: COMPUTERS     Id: 1000037

Links: | account | links | code | trial | bidding | buying | reports | funds | help |

Buyer Reports... Your current activity reports     Status: Active

... Your buying reports

| Seller website | Seller visitors / day | Sale traffic quality | Sale clicks / day | Total sale clicks | Sale click cost | Total net cost | CB fee | Total gross cost | Last click received |
|---|---|---|---|---|---|---|---|---|---|
| Tune-it-up to increase your.. | 600 | 71 | 17 | 67 | $0.03 | $2.01 | $0.201 | $2.211 | 2/4/2002 9:50:44 PM |
| Site Promotion Internet Mar.. | 1196 | 150 | 92 | 987 | $0.05 | $49.35 | $4.935 | $54.285 | 2/13/2002 1:51:40 PM |

... Definitions

Traffic quality = ( page hits / unique visitors ) X time spent per unique visitor Delivery speed = average number of click-throughs / day (clicks/day)

Sale click cost = in US dollars per click-through ($/click)

Total net cost = cost for clicks delivered per transaction

ClicksBroker fee = 10% brokerige fee

Total gross cost = cost of clicks plus ClicksBroker fee

FIG. 28

| clicks˙broker.com | how to buy | how to sell | how to exchange |

| Buyer websites | Seller websites | Exchange websites | search |

Your account balance: $ 49.769 ... Clicks received to date: 40 ... Free clicks received: 180

Site: maui goose... Category: COMPUTERS     Id: 1000037

Links: | account | links | code | trial | bidding | buying | reports | funds | help |

Buyer Bidding Reports... Your current bidding activity reports     Status: Active

... Seller websites you are currently buying from

| SellerID | Seller website | Seller visitors/day | Seller traff.quality | Seller clicks/day | Cost per click | Choose |
|---|---|---|---|---|---|---|
| 1000296 | Site Promotion Internet Mar.. | 1196 | 452 | 92 | $0.05 | end sale |

... Definitions

Traffic quality = ( page hits / unique visitors ) X time spent per unique visitor Delivery speed = average number of click-throughs / day (clicks/day)

Sale click cost = in US dollars per click-through ($/click)

End sale button = click if you want to end the sale process

FIG. 29

| clicks broker.com | how to buy | how to sell | how to exchange |
| Buyer websites | Seller websites | Exchange websites | search | GO |

Your account balance: $ 49.769 ... Clicks received to date: 40 ... Free clicks received: 180

Site: maui goose... Category: COMPUTERS　　　　　　　　　　　　　　　Id: 1000037

Links: | account | links | code | trial | bidding | buying | reports | funds | help |

End purchase... End the sale process　　　　　　　　　　　　　　　Status: Active

You have selected seller web site:

Sallers site: Site Promotion Internet Marketing Sites

Sellers URL: http://127.0.0.1/CB/sell/step1.aspx

Click cost: 0.05

Click to end this purchase

[ End sale process ]

FIG. 30 clicks broker.com | how to buy | how to sell | how to exchange

Buyer websites | Seller websites | Exchange websites | search

Your account balance: $ 49.769 ... Clicks received to date: 40 ... Free clicks received: 180

Site: maui goose... Category: COMPUTERS  Id: 1000037

Links: | account | links | code | trial | bidding | buying | reports | funds | help |

Enter your bid... Bid for seller website visitor traffic  Status: Active

You have selected seller web site:

Sallers site: WWW miodrag kostic website

Sellers URL: http://www.catii.com/index.htm

Current bid: 0.21

Your new bid: 0.30

Submit your bid

[ Submit your bid ]

You have successfuly entered a bid for $0.30

FIG. 32 clicks broker.com | how to buy | how to sell | how to exchange

Buyer websites | Seller websites | Exchange websites | search

Your account balance: $ 49.956 ... Clicks received to date: 4 ... Free clicks received: 60

Site: E commerce hawaii business... Category: BUSINESS  Id: 1000036

Links: | account | links | code | trial | bidding | buying | reports | funds | help |

Buy direct... Buy clicks directly (NO bidding)  Status: Active

List of seller websites offering their clicks for direct sale

| SellerID | Seller website | Seller visitors/day | Seller traff.quality | Seller clicks/day | Seller price/click | Choose |
|----------|---------------|---------------------|----------------------|-------------------|--------------------|--------|
| 1000297 | Web Site Promotion.. | 0 | 0 | 0 | $0.05 | submit |
| 1000298 | WWW miodrag kostic website.. | 0 | 0 | 0 | $0.02 | submit |

FIG. 33 clicks broker.com | how to buy | how to sell | how to exchange

Buyer websites | Seller websites | Exchange websites | search

Your account balance: $ 49.769 ... Clicks received to date: 40 ... Free clicks received: 180

Buyer Websites ... List of sites per category

Please choose category you woold like to see:

Select: BUSINESS  -  [ submit ]

List of all buyers ordered by max.bid

| Buyer website | Category | Max.bid offer | Buying clicks/day |
| --- | --- | --- | --- |
| Adcom kiosks.. | COMPUTERS | 0.3 | 10 |
| Web Promotion Course Manual.. | BUSINESS | 0.2 | 10 |
| maui goose.. | COMPUTERS | 0.08 | 100 |
| Our overarching goals are to become leaders.. | COMPUTERS | 0.08 | 10 |
| The classic wood finish of the PowerNet set.. | COMPUTERS | 0.08 | 200 |
| kg.. | BUSINESS | 0.07 | 10 |
| convenient payment options .. | COMPUTERS | 0.07 | 100 |
| E commerce hawaii business.. | BUSINESS | 0.02 | 10 |
| 1 | | | |

FIG. 34

| clicks broker.com | how to buy | how to sell | how to exchange |

| Buyer websites | Seller websites | Exchange websites | search |

Your account balance: $ 49.769 ... Clicks received to date: 40 ... Free clicks received: 180

Buyer Websites ... List of sites per category

Please choose category you would like to see:

Select: COMPUTERS    [submit]

List of buyers for category ... COMPUTERS

| Buyer website | Buyer max.bid offer | Buying clicks/day | Ask for direct sale |
|---|---|---|---|
| Adcom kiosks.. | 0.3 | 10 | ask buyer |
| The classic wood finish of the PowerNet set.. | 0.08 | 200 | ask buyer |
| maui goose.. | 0.08 | 100 | ask buyer |
| Our overarching goals are to become leaders.. | 0.08 | 10 | ask buyer |
| convenient payment options .. | 0.07 | 100 | ask buyer |

1

FIG. 35 clicks broker.com | how to buy | how to sell | how to exchange

Buyer websites | Seller websites | Exchange websites | search

Your account balance: $0 ... Users at your site today: 0 ... Users at your site right now: 0

Seller Websites ... List of sites per category

Please choose category you woold like to see:

Select: BUSINESS  [ submit ]

List of all sellers ordered by number of visitors/day

| Seller website | Category | Min.bid offer | Seller visitors/day |
|---|---|---|---|
| Tune-it-up to increase your page hits and g.. | COMPUTERS | 0.01 | 4015 |
| hgfigf.. | COMPUTERS | 0 | 45 |
| Web Site Promotion.. | COMPUTERS | 0.01 | 22 |
| WWW miodrag kostic website.. | COMPUTERS | 0.01 | 16 |
| Adcom Kiosks.. | BUSINESS | 0.01 | 15 |
| Site Promotion Internet Marketing Sites.. | COMPUTERS | 0.01 | 13 |
| Hawaiian Leis-wedding leis, tropical flower.. | BUSINESS | 0 | 7 |
| Tune-it-up to increase your page hits and g.. | COMPUTERS | 0 | 7 |
| kqkq.. | BUSINESS | 0 | 7 |
| lhl.. | BUSINESS | 0 | 2 |

1 2

FIG. 36 clicks broker.com | how to buy | how to sell | how to exchange

Buyer websites | Seller websites | Exchange websites | search

Your account balance: $0 ... Users at your site today: 0 ... Users at your site right now: 0

Seller Websites ... List of sites per category

Please choose category you woold like to see:

Select: COMPUTERS    [ submit ]

List of sellers for category ... COMPUTERS

| Seller website | Min.bid offer | Seller visitors/day | Ask for trial |
|---|---|---|---|
| Tune-it-up to increase your page hits and g.. | 0.01 | 4015 | invite seller |
| hgfigf.. | 0 | 45 | invite seller |
| Web Site Promotion.. | 0.01 | 22 | invite seller |
| WWW miodrag kostic website.. | 0.01 | 16 | invite seller |
| Site Promotion Internet Marketing Sites.. | 0.01 | 13 | invite seller |
| Tune-it-up to increase your page hits and g.. | 0 | 7 | invite seller |
| itoiutioutoit.. | 0 | 0 | invite seller |
| WEB TRAFFIC.. | 0 | 0 | invite seller |
| Computer-Aided Technologies International.. | 0 | 0 | invite seller |
| 1 | | | |

…

SYSTEM FOR BUYING AND SELLING CLICK-THROUGH TRAFFIC ON INTERNET WEB SITES

This U.S. patent application claims the priority of U.S. Provisional Application No. 60/274,604 filed on Mar. 9, 2001, and U.S. Provisional Application No. 60/302,863 filed on Jul. 3, 2001, both entitled "System for Buying and Selling Click-Through Visits on the Internet", by the same inventors.

TECHNICAL FIELD

This invention generally relates to systems for commercializing the click-through traffic of visitors to Internet web sites, and more particularly, to a novel Internet-based system for facilitating the buying and selling of click-through traffic between the web sites of interested buyers and sellers.

BACKGROUND OF INVENTION

The commercial Internet has rapidly evolved in about 10 years into a worldwide medium for electronic commerce among hundreds of millions of users and billions of web sites. However, like all channels of commerce, the use of the Internet depends heavily on the development of efficient means for searching and for advertising to bring interested users to the web sites of vendors of relevant products, services, and/or information. Since it is difficult for individual web sites to gain visibility among millions of other sites, vendors have become greatly interested in getting users to visit their web sites by click-through links from search sites, portals, and aggregator sites that can attract large volumes of users on the Internet. As a result, a new market has been created for buying and selling click-through traffic on the Internet through various types of referral, affiliation, and other click-through-selling programs.

In the typical click-through selling today, a seller contracts with a buyer for an upfront fee to sell access to the click-through traffic visiting the seller's web site by posting a link to the buyer's Web site and then also charging the buyer for each visitor who clicks on the seller's link. However, other than a general idea of the total volume of visitors to the seller's web site, the buyer often does not know in advance what volume, responsiveness, or quality of visitors from the seller's web site will click on the link to the buyer's web site. Before contracting for linkage to a seller's web site, a buyer would want to know certain parameters for the click-through traffic, such as is the click-through ratio (linked traffic volume to total seller visitors), delivery speed (number of click-throughs delivered in a given time), and/or traffic quality (level of visitor interest for the buyer's products indicated by the number of pages visited and amount of time spent on the buyer's site). If a buyer could assess parameters such as these, the buyer can then compare one seller's web site to other sites, and determine what upfront fee and/or click-through fee the buyer can justify as the best possible price.

It is therefore highly desirable to have a system that can facilitate the buying and selling of click-through traffic between the web sites of interested buyers and sellers in ways which allow both parties to try out in advance how compatible their sites are. A productive relationship between a buyer and seller will depend on how compatible their sites are for sending the volume and quality of interested visitors that the parties contract for. If these factors can be assessed on an informed basis by conducting comparative trials in advance, the choice for a satisfactory and productive relationship becomes more likely.

SUMMARY OF INVENTION

In accordance with the present invention, a system for buying and selling of click-through traffic between web sites of interested buyers and sellers on the Internet comprises:

(a) an intermediary web site accessible through the Internet for registering buyers and sellers interested in buying/selling click-through traffic of visitors to sellers' web sites for linking to buyers' web sites;

(b) a first facility for establishing a link from an interested seller's web site to the intermediary web site, and for storing link contents of a plurality of interested buyers' web sites at the intermediary web site, wherein the respective link content of a buyer's web site can be addressed through the intermediary web site by the link from the interested seller's web site for display on the seller's web site;

(c) a second facility for conducting a trial of click-through traffic sent from said seller's web site to each of said plurality of interested buyers' web sites by the intermediary web site conducting the addressing of the respective link content of each buyer's web site in turn during a trial of the seller with each respective buyer during a given trial period;

(d) a third facility for conducting a bidding process after the trial period is concluded, in which buyers can bid a price each is willing to pay for the click-through traffic from the seller's web site; and (e) a fourth facility for enabling the seller to select a winning buyer and conclude a sale of click-through traffic from the seller's web site to the winning buyer's web site.

In the present invention, the intermediary web site conducts the trial by measuring the click-through traffic actually sent from the seller's web site to each designated buyer's web site during the trial period and displaying the measured traffic to the seller and buyers so that the buyers can make more informed bids and the seller can make a more informed winning bid selection during the bidding process. A buyer may approve linking with a number of sellers during more than one trial conducted in the same trial period, in order to assess which seller sends the best click-through traffic. The present invention also includes facilities for enabling buyers and sellers to conduct the trial process and/or the bidding process automatically or manually, or by direct exchange between the seller and a selected buyer. When the seller has selected the winning buyer and the sale is concluded by linking the seller's click-through traffic through the intermediary web site to the winning buyer's web site, the intermediary web site continues to measure the click-through traffic sent from the seller's web site to the winning buyer's web site, so that both parties can continue to monitor the productivity of their relationship. If either party should become dissatisfied with continuing the relationship, it may terminate the sale (the linking relationship) and re-enter the trial and bidding processes on the intermediary web site with other parties.

As another aspect of the invention, an online, interactive system is provided for buyers and sellers of click-through traffic to bid/sell, then activate and monitor the performance of the click-through traffic sold in a sale transaction. The system comprises:

(a) an intermediary web site accessible through the Internet for registering buyers and sellers interested in buying/selling click-through traffic of visitors to sellers' web sites for linking to buyers' web sites;

(b) a first facility for establishing a link from an interested seller's web site to the intermediary web site, and for storing link contents of interested buyers' web sites at the intermediary web site, wherein the respective link content of a buyer's web site can be addressed through the intermediary web site by the link from the interested seller's web site for display on the seller's web site;

(c) a second facility for monitoring the performance of click-through traffic sent from a seller's web site to a buyer's web site through the intermediary web site in response to the link from the seller's web site;

(d) a third facility for conducting an interactive bidding process of interested buyers for the seller's click-through traffic online at the intermediary web site; and (e) a fourth facility for enabling the seller and winning buyer to conclude a sale of click-through traffic from the seller's web site, and to monitor the performance of click-through traffic sent to the winning buyer's web site using the second facility so that the seller and buyer can be apprised of the performance of the click-through traffic.

As other alternatives, the intermediary web site can enable a seller with a multi-page or multi-channel web site to conduct multiple trials with selected buyers simultaneously, by using seller subdesignations or aliases to set up separate trials and/or bidding processes with interested buyers for each corresponding page or channel of the seller's web site. Alternatively, the trial and bidding processes may be conducted in a reverse auction model, in which a buyer can open an offer to purchase click-through traffic of specified parameters for bidding to a number of interested sellers. The intermediary web site can implement a business model based upon a commission earned for each click-through sent from a seller's to a buyer's web site, a commission earned on each sale transaction concluded, or any other suitable business model for the exchange and/or auction site for buyers and sellers of click-through traffic. The invention also encompasses related methods and program implementations for all of these novel functions.

Other objects, features, and advantages of the present invention will be explained in the following detailed description of the invention having reference to the appended drawings.

BRIEF DESCRIPTION OF DRAWINGS

FIG. 3 illustrates different modes for buyers and sellers to engage in trial, bidding and sale processes.

FIG. 7 is a screen shot example of a main menu page for an implementation of the Intermediary Web site (ClicksBroker).

FIG. 8 is a screen shot example of a seller information submission page for the ClicksBroker site.

FIG. 9 is a screen shot example of a seller links style submission page.

FIG. 10 is a screen shot example of the links codes a seller obtains from ClicksBroker for embedding in the seller's web site.

FIG. 11 is a screen shot example of a seller bidding preferences page.

FIG. 12 is a screen shot example of a display page to the seller of buyers available for trial.

FIG. 13 is a screen shot example of a bidding activity report to the seller to start a bidding process.

FIG. 14 is a screen shot example of a bidding activity report to the seller on a buyer in the bidding process.

FIG. 15 is a screen shot example of a selling activity report to the seller on click-through traffic sent to the winning buyer in a sale process.

FIG. 16 is a screen shot example of a sale termination page to the seller to end the sale process.

FIG. 17 is a screen shot example of a sale ending report to the seller at the end of the sale process.

FIG. 18 is a screen shot example of a request page to the seller for a direct sale of click-through traffic.

FIG. 19 is a screen shot example of a buyer information submission page for the ClicksBroker site.

FIG. 20 is a screen shot example of a buyer's ad content submission page.

FIG. 21 is a screen shot example of the tracking code a buyer obtains from ClicksBroker for embedding in the buyer's web site.

FIG. 22 is a screen shot example of a buyer bidding preferences page.

FIG. 23 is a screen shot example of a display page to the buyer of account status.

FIG. 24 is a screen shot example of a display page to the buyer of sellers offering click-through traffic.

FIG. 25 is a screen shot example of a seller selection page to the buyer for trial.

FIG. 26 is a screen shot example of a seller activity report to the buyer in a trial process.

FIG. 27 is a screen shot example of a seller activity report to the buyer in a sale process.

FIG. 28 is a screen shot example of a seller activity report to the buyer to end the sale process.

FIG. 29 is a screen shot example of a sale ending report to the buyer at the end of the sale process.

FIG. 30 is a screen shot example of a bid submission page to the buyer.

FIG. 32 is a screen shot example of a display page to the buyer listing sellers offering a direct sale.

FIG. 33 is a screen shot example of a display page listing all buyers for a seller to view, and FIG. 34 is a listing of buyers in a selected category.

FIG. 35 is a screen shot example of a display page listing all sellers for a buyer to view, and FIG. 36 is a listing of sellers in a selected category.

DETAILED DESCRIPTION OF INVENTION

Figure 1:
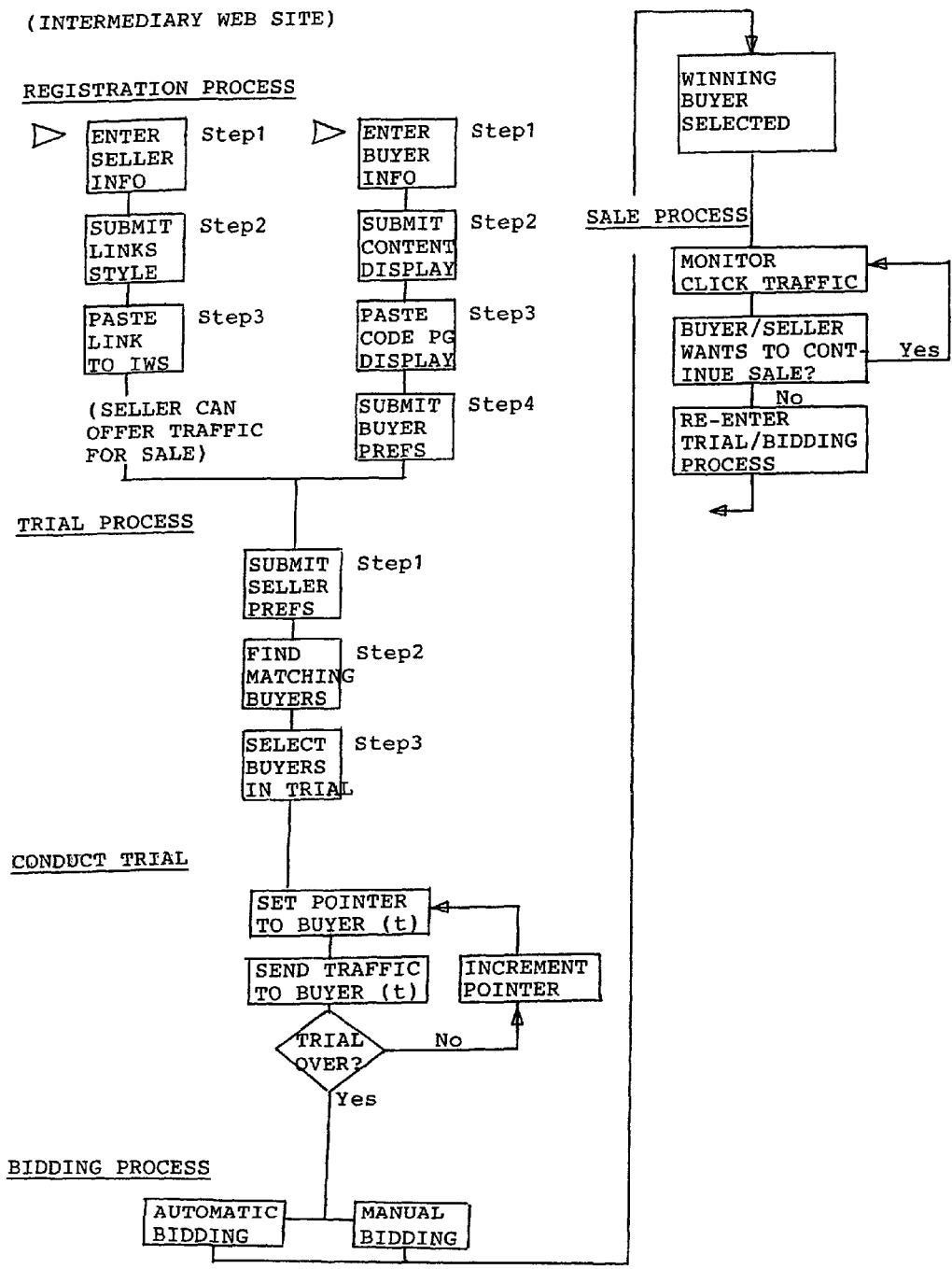
FIG. 1 is a schematic illustration of the main processes for a preferred implementation of the present invention.

Referring to FIG. 1, the main processes for a preferred implementation of the present invention are illustrated schematically. The Intermediary Web Site (IWS) offers facilities on the Internet for facilitating the buying and selling of click-through traffic between the web sites of interested buyers and sellers. In the Seller Registration Process, a Seller registers information about its web site in Step 1, submits the style(s) of links to be displayed on the Seller's web site in Step 2, and pastes a link code for redirecting the user visiting the Seller's web site and clicking on the embedded link to the Intermediary Web Site in Step 3. In the Buyer Registration Process, a Buyer registers information about its web site in Step 1, submits the content to be displayed at a link on a Seller's web site in Step 2, pastes the IWS code page for the Buyer's content with its web site program in Step 3, and chooses the Buyer's bidding preferences (minimum click-through, speed, quality) in Step 4. Upon registration, Sellers and Buyers are qualified and given access (e.g., by user ID and passcode) to areas designated for them, respectively, on the IWS site. Sellers and Buyers data are stored with the IWS database, and may be modified by the respective parties if desired.

A registered Seller may then offer its click-through traffic for bidding to any interested Buyers. The Seller initiates a sale offer by having a Trial Process and a Bidding Process conducted on the IWS site. In the Trial Process, the Seller submits its bidding preferences (minimum acceptable bid and minimum click-through ratio) at Step 1, the IWS then finds those Buyers whose bidding preferences match the Seller's and displays them for Seller selection in Step 2, and the Seller selects those Buyers it wishes to conduct a Trial with in Step 3. The IWS then conducts the Trial Process by sending click-through traffic linked to the IWS site to each one of the designated Buyers in turn during the Trial Period. For example, 10 Buyers may be selected, the Trial Period can remain open until each Buyer has received a sample of 20 clicks of the Seller's click-through traffic.

After the Trial Period is closed, the Bidding Process begins. Depending upon the policies of the IWS site, the Bidding Process may be conducted blind (each Buyer sees only the metrics for click-through traffic that Buyer received and the bid that Buyer chooses to make), or in the open (all Buyers see the metrics and bids of all Buyers). Depending upon the parties preferences, the Bidding Process may be conducted automatically (IWS designates the winning bid as the highest earning per visitor to the Seller), or manually in which the Seller selects the winning bid based on factors considered by the Seller. The Seller and winning Buyer are then notified of the results of the Bidding Process by the IWS site.

When the Seller has accepted the winning bid, the parties enter the Sale Process in which the IWS establishes a link to send the Seller's click-through traffic to the winning Buyer's web site for the duration of the Sale. The IWS continues to measure the click-through traffic and displays the metrics so that both parties can continue to monitor the productivity of their relationship. If either party should become dissatisfied with continuing the relationship, it may terminate the Sale and re-enter the Trial and Bidding Processes with other parties.

With the links code pasted in the Seller's web site program, each time a visitor visits the web site during a trial, sale, or other transaction monitored by the IWS, the web site server will load the site's web page in the user's browser and fetch the file content for the Buyer's ad or banner from the IWS JS file address to which the links code points for display in the links area on the Seller's web site page. An example of the links code is shown in FIG. 10. The JS file is set up with initial content for display on the Seller's web site when the seller has registered with the IWS to sell its click-through traffic. A sample of an initial JS file is given below:

> :document.writeln('CLICK HERE FOR CONNECTION VIA CLICKSBROKER WE CAN LINK YOU TO A RECOMMENDED VENDOR OF INTEGRATED KIOSKS.');

When a trial or sale is established to a buyer's web site, the initial content of the JS file is overwritten with the buyer's link content, which is then displayed on the Seller's web site through the Seller's link to the IWS. When the visitor to the Seller's web site clicks on the links area, a click-through message is sent to the IWS, and the visitor is then redirected to the Buyer's web site. Similarly, when the Buyer's web site program loads the web page for the visitor, it executes the IWS code page embedded by the Buyer, and enables the visitor's movements around the Buyer's web site to be tracked with click messages sent to the IWS. The IWS program has a tracking component that tracks and records the transaction ID, time, and address of all messages sent to the IWS by participating web sites.

Using the facilities provided by the IWS, Sellers and Buyers can conduct online transactions for buying and selling click-through traffic based on real-time information for informed decision-making and choosing the best price in relation to the quality of click-through traffic offered. The time for parties to find each other, and to try out, bid, and contract for click-through traffic can be greatly shortened and expedited. Buyers can enter into multiple trial processes to assess which Sellers' web site(s) are most compatible with theirs. Sellers can obtain the best returns for their click-through traffic from among buyers bidding through the bidding process. After a sale is concluded, the IWS monitoring of the click-through traffic allows Buyers and Sellers to be continuously apprised of the productivity of their advertising/linking relationships, and can easily terminate them and re-enter new bidding processes via the Intermediary Web Site.

Figure 2:
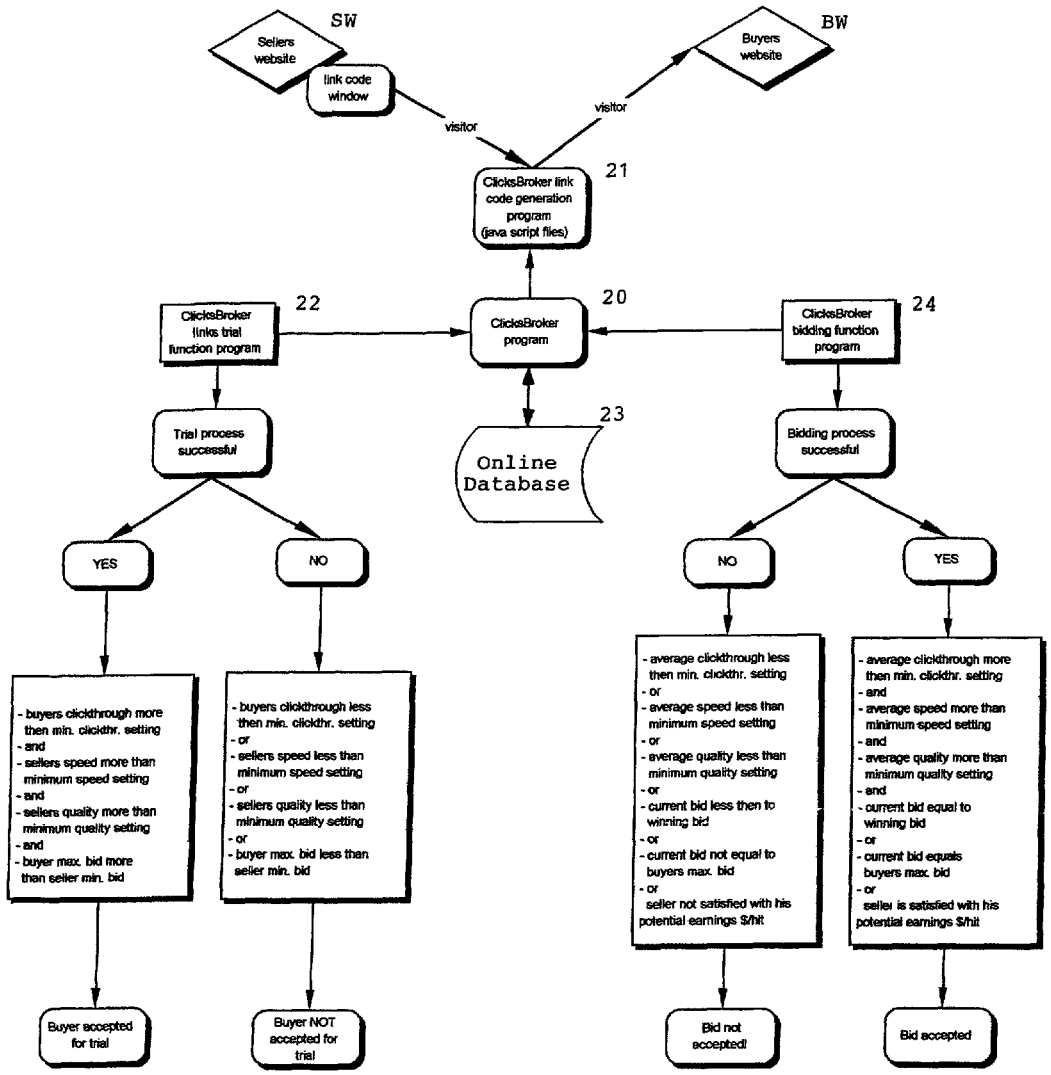
FIG. 2 is a process diagram illustrates the trial process and the bidding process performed by the Intermediary Web Site program.

In FIG. 2, a more detailed description of the process flow and functional steps performed by the preferred implementation of the invention is provided. The Intermediary Web Site is referred to hereafter as the "ClicksBroker" site or program 20. When the Buyers and Sellers have registered and a Seller has offered its click-through traffic for sale, the ClicksBroker program 20 enables the ClicksBroker links trial function program 22 to set up the Trial Process. If the setting up of the Trial Process is successful ("Yes"), it means that the Buyer has indicated minimums for delivery speed and/or quality level and a maximum bid that are met by the preferences for the Trial Process input by the Seller. If the minimum preferences of the parties are not met ("No"), then the Buyer is not accepted for the Trial Process. The ClicksBroker program can then conduct the Trial Process with the Buyers accepted by the Seller. For each accepted Buyer during the Trial Process, the ClicksBroker program 20 enables the link code generation program 21 to write Java script files which are used to link traffic coming from the Seller's web site SW to ClicksBroker and on to each Buyer's web site BW in turn. The ClicksBroker program monitors the traffic sent from the Seller to each Buyer and stores the data in the ClicksBroker database 23.

When the Trial Process has been completed, the ClicksBroker program 20 enables the ClicksBroker bidding function program 24 to conduct the Bidding Process. A successful Bidding Process ("Yes") means that the average of click-through ratio and/or quality actually received by the Buyer in the Trial Process have met the parties' requirements, and that the Buyer's bid is the highest bid or is the Buyer's maximum bid or is otherwise satisfactory to the Seller, so that the Buyer bid is accepted as the winning bid. If the minimum requirements of the parties are not met ("No"), then the Buyer is not accepted as the winning bid.

Figure 2A:
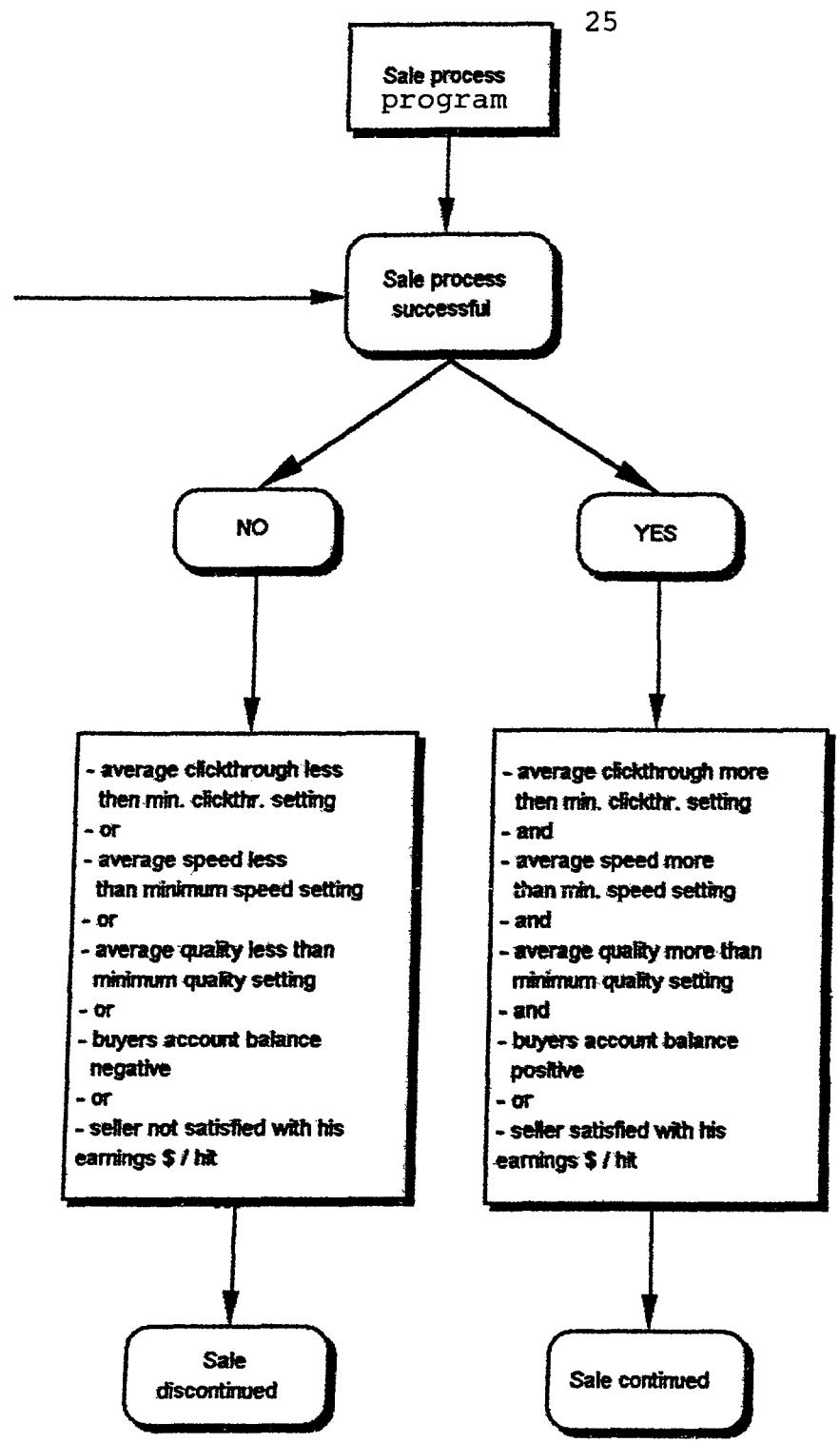
FIG. 2A illustrates the sale process.

In FIG. 2A, when the Bidding Process has resulted in the Seller's acceptance of the winning bid, the ClicksBroker program 20 enables the ClicksBroker sale process program 25 to monitor the sending of click-through traffic from the Seller's web site through ClicksBroker to the winning Buyer's web site, and to display the ongoing metrics of the click-through traffic. A successful Sale Process ("Yes") means that the average of delivery speed and quality continuing to be received by the Buyer meet the Buyer's requirements, and that the Buyer is making satisfactory payment to the Seller or the earnings received by the Seller are otherwise satisfactory, so that the Sale Process will be continued. If the requirements of the parties are not met or either party is otherwise unsatisfied with the relationship ("No"), then the Sale process will be discontinued.

FIG. 3 illustrates several different modes in which Sellers and Buyers can engage in the Trial/Bidding and Sales Processes. A Buyer (#1) can engage in multiple Trial Processes (trialid#1, trialid#2) with different Sellers (#1, #2). A Seller (#3) can conduct a Trial Process (trialid#3) with one particular Buyer (#3). A Buyer (#4) can be engaged in a Sales Process (transactionid#1) with one Seller (#4), while participating in another Trial Process (trialid#4) with another Seller (#5), while other Buyers (#5) can remain in the IWS database but not participate in any ongoing processes.

Sellers Registration Process

After entering personal information, login information and website information, the Seller chooses a textual link display style, including font: (type, color, size), and label: (width, background color, padding and border). After viewing the link, if satisfied, the Seller is redirected to a page to copy out a links code to paste on pages where the links will be displayed. During an initial pre-qualification stage, the links point to ClicksBroker and send a given number of clicks, e.g., 20 clicks or 20 unique visitors. During this time, the visitor traffic and other parameters are measured. After this stage, ClicksBroker notifies the qualified Seller that it is ready for the next step to go on trials with selected buyers. If the website traffic appears low (below 500 visitors per day), the Seller may be recommended to sell the click-through traffic directly to a buyer (no trials).

Trial Process for Sellers

If the Seller chooses trials, it is first given a choice to set bidding preferences, such as the minimum required click-through ratio (number of visitor clicks per number of link impressions served), the minimum acceptable bid (lowest price per click Seller is willing to accept), maximum bid (for limiting the number of selectable buyers), bidding length, and auto/manual bidding choice. The Seller is then given a list of Buyers registered with ClicksBroker that meet the Seller's requirements and have chosen to participate in trials. The Buyers recommended to Seller are selected to have bidding preferences that reflect the Seller's parameters for visitor traffic and bidding preferences. The more visitors a Seller has, the more the Seller can demand for his click-through traffic. The system allows the Seller to choose a predetermined limit, say up to 10, buyers for a trial at any one time. Once the Seller chooses them and starts the trial process, each Buyer's link is established by ClicksBroker and maintained for a given period or amount of clicks, for example, until the Seller delivers 20 clicks to each Buyer. It is important to note that, in the basic mode of operation, the Seller can only deliver click-through traffic to one Buyer's website at a time during trials. (There are 3 modes for delivery of clicks from a Seller, i.e., to ClicksBroker at the pre-qualification stage and intermediary stages, to a trial partner during a trial period, or to a sale transaction partner after one is selected as the winning bidder). Once the trials are over, the Seller is ready for the bidding process.

Automated Trial Process for Sellers

The Seller can also choose to have his trial process conducted automatically or manually. In the automatic mode, the trial process would start immediately after the Seller has been qualified by ClicksBroker and the website traffic patterns have been confirmed by ClicksBroker. Up to 10 Buyers are automatically selected by ClicksBroker by matching their minimums to the Seller's visitor traffic and bidding preference settings. The Buyers selected are those that have websites that fit into the Seller's maximum/minimum bid range and click-through ratio (in that category). If the Seller chooses, the whole process from registration to sale transaction can be conducted automatically without the need for the Seller's intervention.

The Bidding Process for Sellers

At the beginning of the Bidding Process, all Buyers that have ever had a trial with the Seller are notified by e-mail and can view a new table at their bidding page on the ClicksBroker site where the Seller's website is listed as available for bidding. If the Seller has chosen auto-bidding, then the bidding will start automatically if any of the Buyers that participated in the trials earlier also elected the auto-bidding mode. The bidding starts automatically with the Seller's minimum bid amount entered automatically for the Buyer(s) who elected auto-bidding. Otherwise, the Seller can initiate the bidding process and wait for the first Buyer to enter a bid. During the Bidding Process, the Seller is presented with the current results of the bidding process. After the bidding process is over (the length is set by Seller as a bidding preference), the Seller is notified and displayed a table with the bidding results. He can choose a sale transaction partner not only by who offered the highest bid per click-through, but also by how much will the Seller stands to earn per impression served from the website. Thus, a Seller may choose the Buyer who has a lower price per-click offer but a higher click-through ratio, and thereby earn more than if the Seller had chosen a higher price per click. Once the Seller has decided on the most profitable relationship, the Sale Process can begin.

Automated Bidding Process for Sellers

If the Seller elected the automated bidding process, then the bidding would start automatically after the last of the Buyers' trials is over. A winning Buyer would be selected automatically according to which offered the highest earnings per impression, i.e., the best combination of click-through ratio and price per click. The Sale Process would then start immediately.

Sale Process for Sellers

During the Sale Process, ClicksBroker monitors the click-through traffic between a Seller and the winning Buyer. The Seller and Buyer can both see the results of the click-through traffic and monitor the click-through ratio, traffic quality, and number of clicks delivered. At any moment, if either party is not satisfied with the Sale Process, that party can choose to stop the sale. The relationship between the Seller and a clicks Buyer on the Intermediate Web Site is thus a dynamic process where the parameters may change in real time and the parties can elect to continue or terminate the sale. This ensures that the relationship remains successful only as long as both the Seller and Buyer are satisfied at every moment of the process. The parties can then decide to re-enter the trial/bidding process or offer/bid for clicks (links) on a direct sale basis.

Automated Sale Process for Sellers

The Seller can have the sale stopped automatically if the selling relationship with the Buyer falls short of the Seller's requirements. For example, if the click-through ratio during the sale process goes down more than the minimum click-through ratio setting, e.g., 30% for period of more than a week, then the sale would be terminated immediately. The Seller and Buyer would be automatically notified by ClicksBroker. Either party may then re-enter the trial and bidding process in search for a better relationship.

Direct Sale Process for Sellers

ClicksBroker can offer Sellers the option of electing the Direct Sale process which is more suitable for sites with small visitor traffic, where going to trials with many buyers may be impractical. Also, if the Seller wants to sell its click-through traffic fast and bypass the trial and bidding process, then Direct Sale may be preferred. In the Direct Sale, the Sellers list their website traffic parameters and their price/click requirement, and interested Buyers can choose the Seller(s) they feel offer the most profitable matches, and start the sale process immediately.

Clicks Exchange Process

The Clicks Exchange works in the same way as the basic buyer/seller process described above except for the bidding process. The Exchange partners are redefined as clicks Senders and clicks Receivers, and each Exchange partner's website is given a ClicksBroker links code. The clicks each Sender sends and each Receiver receives are recorded. So the exchange relationship is defined by two click-through sending relationships and their results are compared to produce the metrics (same as above) that define the exchange parameters to give the Exchange partners information on the success of their interaction. Exchange can be automated in the same way as buying or selling, where click-through ratio and traffic quality are compared to minimum and maximum settings to guide the exchange process.

Buyers Registration Process

After entering personal information, login information, website information and how much click-through traffic is desired, the Buyer submits the advertising or banner display content to ClicksBroker. For example, the Buyer can enter two textual titles and descriptions of the website and up to three banner links of various sizes. Then, the Buyer is given a tracking code to paste on the clicks-receiving pages. After the code is pasted on the Buyer's pages, the Buyer must verify the links with ClicksBroker to activate the account. Once the account is activated, the Buyer can select bidding preferences, such as minimum required traffic quality (page hits per unique visitors multiplied by time spent per unique visitor), required clicks per day delivery, minimum bid (used to limit the number of sellers), maximum bid (the highest amount per click willing to pay) and auto/manual bidding choice. Settings are recommended according to the click-through traffic the Buyer is looking to buy. The more clicks the Buyer is willing to buy, the better deal the Buyer can expect from Sellers who are looking to sell more clicks. The last step in the registration process is for the Buyer to make an initial deposit or credit card charge authorization for payment in a sale transaction.

Trial Process for Buyers

At the beginning of a Trial Process, the Buyer is offered a choice of Sellers with which to participate in trials. The Sellers are selected according to the Buyer's bidding preferences for the best seller matches in the Buyer's category, such as min/max bidding range and minimum required traffic quality. The Buyer can choose to ask one or more Sellers for trial. A Trial Process can be started with each Seller that accepts the Buyer. The Buyer can wait for trials to come through, or may also search for direct sale partners and start a sales transaction immediately. The Buyer can have as many simultaneous trials, sale, or direct sale transactions as desired.

Automated Trial Process for Buyers

If the Buyer elects the automatic mode, ClicksBroker will select the Sellers (who also elected the automatic trial option) in the Buyer's category that fit the min/max bid settings and minimum traffic quality requirements. The Sellers are notified by ClicksBroker automatically of the Buyer's participation in trials, and the Buyer is able to view the results of all trials and click-through traffic received on the webpage set up for the Buyer's account.

Buyers Bidding Process

As Sellers complete their trials, the Buyer would be invited to participate in the bidding process. The Buyer would then place any bids, and after the bidding process is over, would be selected by a Seller upon providing the best bid and match to the Seller's requirements.

Automated Bidding Process for Buyers

If the Buyer has chosen auto-bidding as his preference, then the Buyer's bids would be entered automatically in increments of one cent ($0.01) as necessary to be the highest bidder, until reaching the maximum bid set by the Buyer. The automatic bidding guarantees that the Buyer will not lose in the bidding through oversight, as long as the current bid is lower than the maximum bid set in the Buyer's preferences. Once the bidding is over, the Buyer is chosen automatically if providing the best bid and match to the Seller's requirements. A Sale Process is then started by ClicksBroker between the sale partners automatically.

Buyers Sale Process

During the sale process, the Buyer can monitor the results of the sale in terms of traffic quality and number of clicks delivered. At any moment, if not satisfied with the sale process, the Buyer can choose to stop the sale. The relationship between the clicks Buyer and Seller on the Internet is thus made into a dynamic process where parameters involved may change in real time. The relationship can thus be considered successful as long as both the Buyer and Seller remain satisfied.

Automated Sale Process for Buyers

If the Buyer chooses the automated sale process, the Buyer's purchase transaction is stopped automatically if the relationship with the Seller falls short of the Buyer's requirements set in the Buyer's preferences, e.g., if traffic quality goes down more than 30% from minimum traffic quality setting for period of more than a week.

Buyers Direct Sale Process

If in need of a great number of visitors, a Buyer can start any number of direct sale transactions (no trial or bidding involved). The Buyer only has to chose from the list of qualified Sellers provided by ClicksBroker who are offering their clicks for direct sale. After choosing one or more direct sale Sellers, the sale process is started. The direct sale can be stopped at any moment if either party is not satisfied with the relationship.

Example of An Intermediary Web Site Program

An Intermediary Web Site program was built using the Microsoft VisualStudio.net development environment and particularly its ASP.NET feature, with VisualBasic.net as the programming language. The IWS database was built on Microsoft SQL Server 2000 and contained 35 different tables where data is stored during the ClicksBroker processes.

User interfaces were constructed as asp.net web pages (extension .aspx) and business logic was performed using a number of VisualBasic.net components and classes (extension .vb) that manipulate data inputted by users and stored in the database or retrieved from the database and displayed to users. Each database table had a component that worked as an interface between the program and the database and set the parameters for SQL stored procedures (over 150 of them) that performed all of the database functions.

The tracking of click-through traffic was maintained as a global.aspx file where server variables are retrieved for every user session. Using advanced ASP.net tracking features and request string passed by ClicksBroker member websites links, each hit, click, page viewed, and the time viewed was recorded in the database logs tables. The request string is part of the ClicksBroker code that Sellers and Buyers paste on their websites. For example, the links code can have 12 digits where if the first character is "1", the link is sending to the ClicksBroker web site, and if it is "2", then the link is sending traffic to trial partners, and if it is "3", then the link is sending to a sale transaction partner.

The minimum required parameters for click-through traffic were recorded: hit (link impression on sellers link); click (click on the seller link); pages (number of pages viewed on the buyers website); and time-spent (viewing buyers pages). This allowed computation of the seller's click-through ratio as hits/clicks, the seller's traffic quality as hits*timespent/clicks, the clicks per day or speed of delivery, the seller's real earnings as $/hit, and other important parameters that define the seller/buyer relationship.

Links were automatically served using simple Java Script (compatible with all browsers) and specifically by creating a small Java Script (extension .js) file in the ClicksBroker links directory for each link on the seller's website. The seller's link pointed to that particular JS file and, if the buyer is changed, the content of that JS file is over-written by information from the new buyer taken from the database. The file held the content of the buyer's ad messages and, more importantly, the relationship (trial or transaction) id number in the form of a request string added to the buyer's link. The relationship id was a 12 digit number that corresponds to a particular database table, such as: (1) affiliateid in an affiliate table; (2) trialid in a trial table; or (3) transactionid in a transaction table. The relationship id thus identifies the seller/buyer relationship as affiliate, trial or sale transaction.

A detailed outline of program components in the example of the Intermediary Web Site (ClicksBroker) is appended hereto as Appendix 1.

A program listing of the tracking component used for tracking metrics of the click-through traffic sent from a Seller's web site to a Buyer's web site is appended hereto ask Appendix 2.

Figure 4:
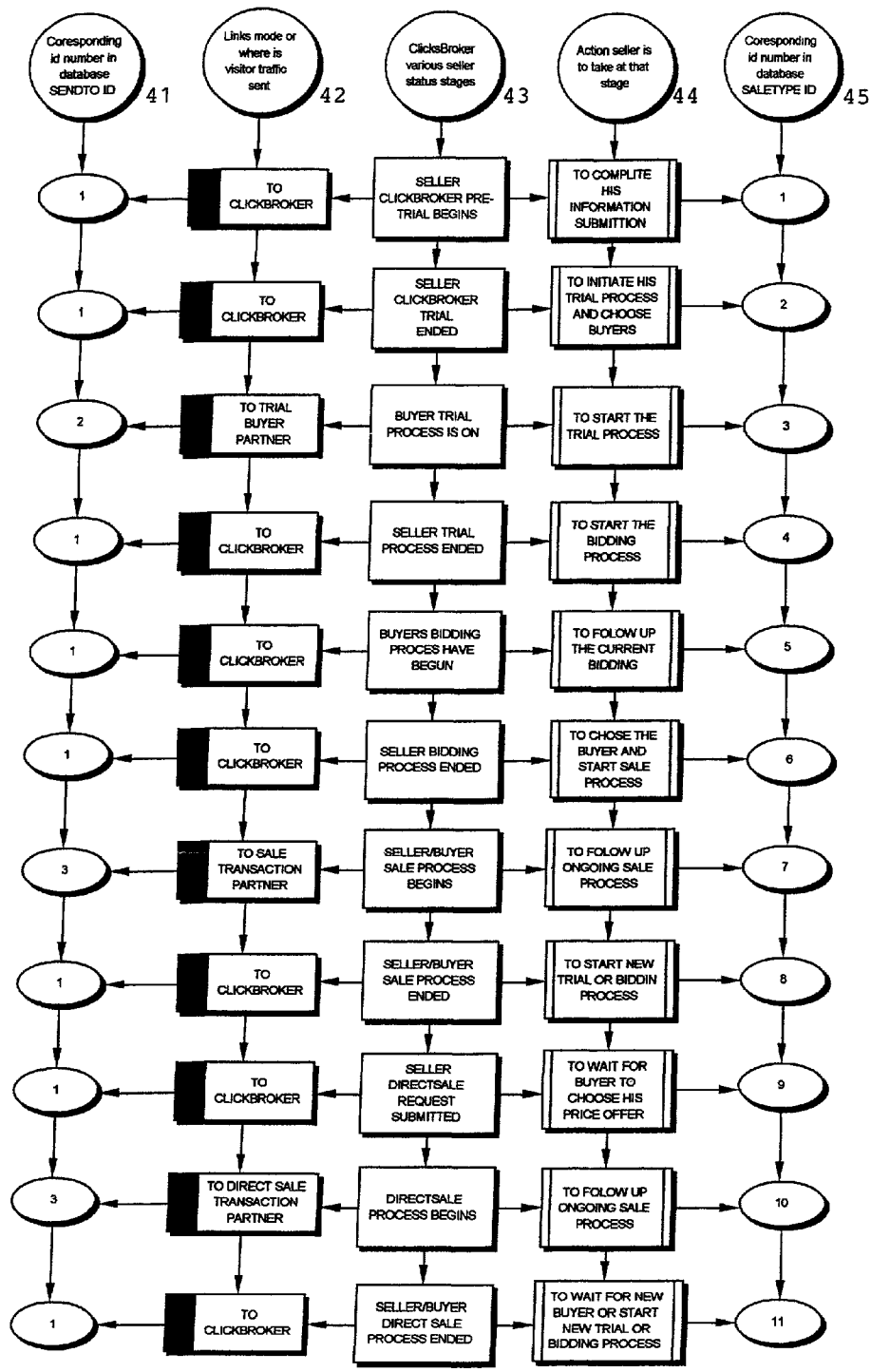
FIG. 4 is a state diagram for processes performed in the Intermediary Web Site program.

FIG. 4 is a state diagram illustrating the processes going on in the above-described implementation example of the ClicksBroker program. Column 45 indicates the corresponding id number in the database for each type of process stage (Type 1 to Type 11), referred to as "SALETYPE ID". Column 44 indicates the action the seller is taking at each type of process stage. Column 43 indicates the status of the various Sellers or Buyers at each process stage within the ClicksBroker program. Column 42 indicates the links mode or where the traffic is sent at each process stage. Column 41 indicates the corresponding datatype id number in the ClicksBroker database addressed by the program.

For example, in process stage Type 1, the Seller is to complete the submission of information, ClicksBroker is engaged in pre-trial qualification of the Seller, the focus of transaction is at ClicksBroker, and the datatype id number is indicated as "1" (data collection and storage). In Type 2, the Seller is to initiate a Trial Process and choose Buyers, ClicksBroker has completed pre-trial qualification of the Seller, the focus of transaction is at ClicksBroker, and the datatype id number is indicated as "1". In Type 3, the Trial Process is started, ClicksBroker is conducting a trial with each Buyer, the focus of transaction is at the Buyer, and the datatype id number is indicated as "2" (providing/storing data to/from an external entity). In Type 4, the Seller is starting the Bidding Process, ClicksBroker has completed the Trial Process with the Buyers, the focus of transaction is at ClicksBroker, and the datatype id number is indicated as "1". In Type 5, the Bidding Process is underway, ClicksBroker is displaying information to the Buyers and receiving their input, the focus of transaction is at ClicksBroker, and the datatype id number is indicated as "1". In Type 6, the Seller is choosing the winning bid, ClicksBroker has completed the Bidding Process, the focus of transaction is at ClicksBroker, and the datatype id number is indicated as "1". In Type 7, the Sale Process is underway, ClicksBroker is monitoring traffic between the Seller and winning Buyer, the focus of transaction is at the Sale transaction partners, and the datatype id number is indicated as "3" (data collection/storage from monitoring external entities). In Type 8, a new Trial or Bidding Process is to be started, ClicksBroker has ended a Sale process, the focus of transaction is again at ClicksBroker, and the datatype id number is indicated as "1".

As an alternative to Trial/Bidding with a number of interested Buyers, a Seller can conduct a Sale Process (without trial or bidding) with one chosen Buyer, and conduct a negotiation directly (manually) with the Buyer. In Type 9, the Seller initiates a Direct Sale, ClicksBroker sets up the Direct Sale process, the focus of transaction is again at ClicksBroker, and the datatype id number is indicated as "1". In Type 10, the Seller engages in the Direct Sale with the Buyer, ClicksBroker conducts the Direct Sale Process, the focus of transaction is at the Direct Sale partner, and the datatype id number is indicated as "3". In Type 11, the Direct Sale is concluded, ClicksBroker has completed the Direct Sale process and can start a new process, the focus of transaction is at ClicksBroker, and the datatype id number is indicated as "1".

Figure 5:
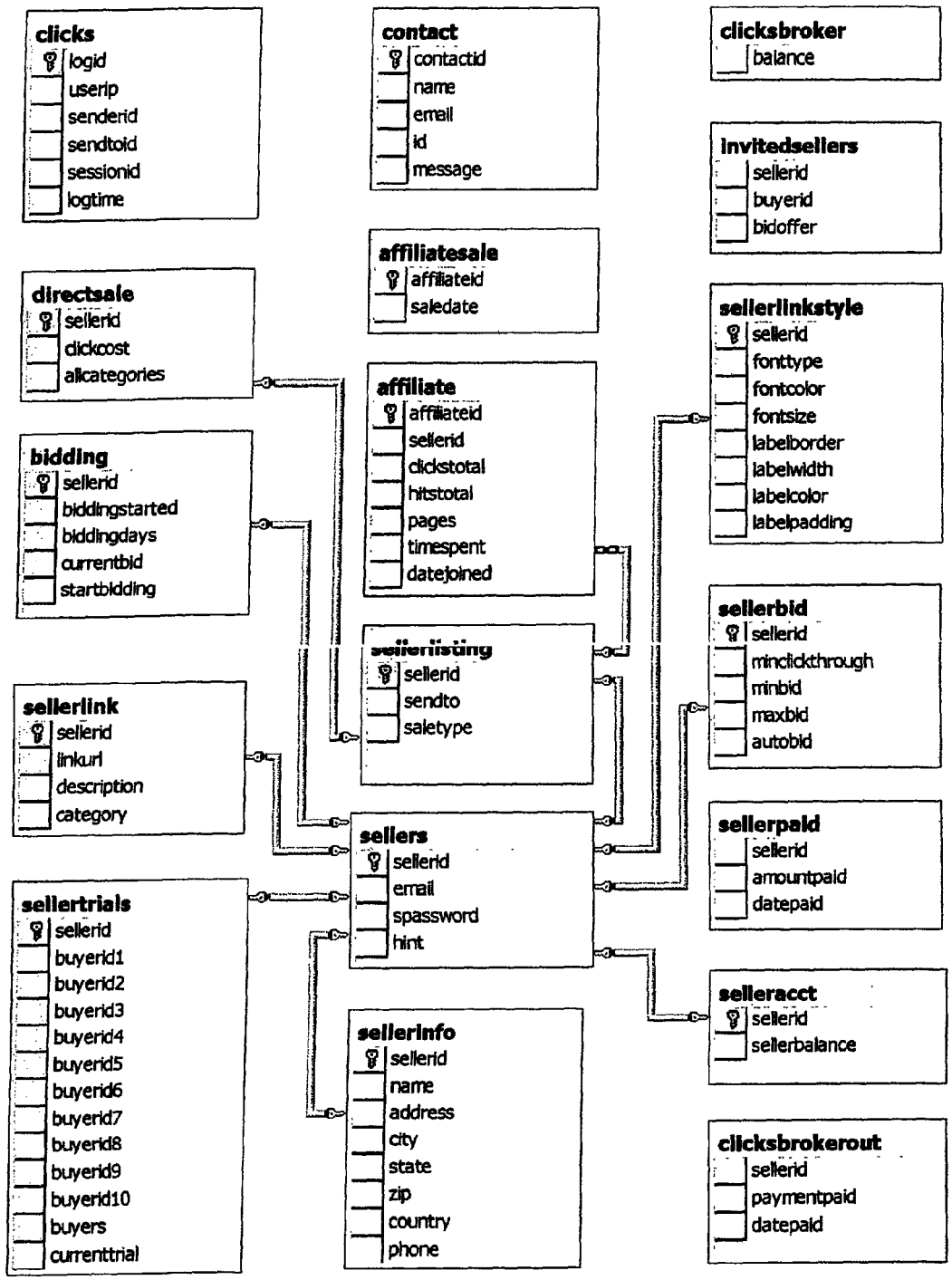
FIG. 5 illustrates the database indexing of Seller data.

FIG. 5 illustrates the database indexing of Seller data. The "sellers" data store the Seller's information for online usage, while "sellerinfo" stores other offline information. The "sellerlinkstyle" data store the Seller's preferred style of links display, and "sellerbid" store the Seller's expected minimum click-throughs and minimum and maximum bids that would be considered or election of automatic selection of highest bid. The "sellertrials" data store the record of trials engaged by the Seller, and "bidding" store the record of bidding engaged by the Seller. The "sellerlisting" stores records of current Seller's status, and "sellerlink" stores data on the Seller's web site. The "selleracct" data maintain the Seller's account balance. The "clicks" data record the history of Buyers' users sessions with the ClicksBroker site, and other housekeeping data records are also indicated.

Figure 6:
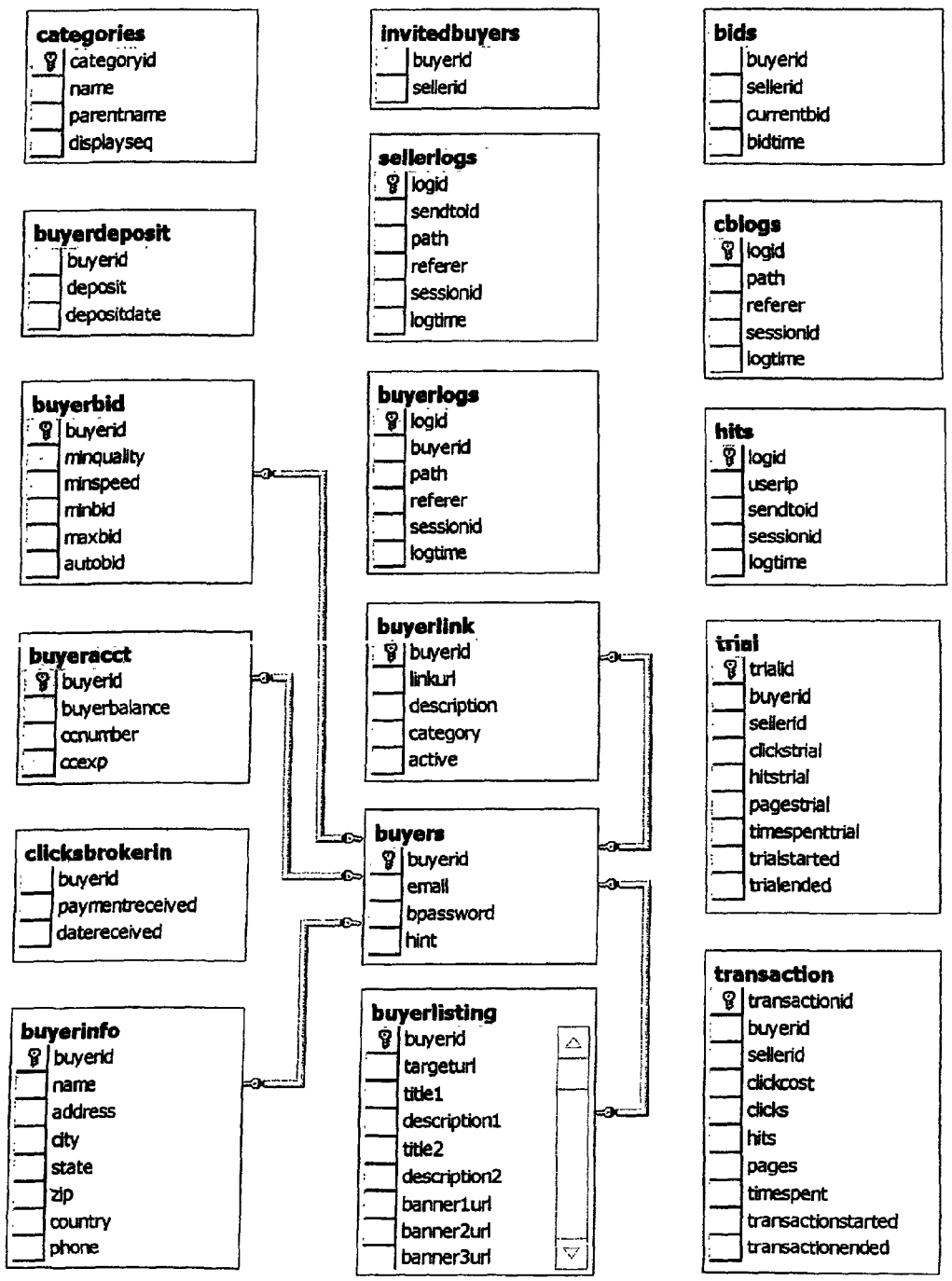
FIG. 6 illustrates the database indexing of Buyer data.
Figure 31:
FIG. 31 is a screen shot example of a direct sale submission page to the buyer.

FIG. 6 illustrates the database indexing of Buyer data. The "buyers" data store the Buyer's information for online usage, while "buyerinfo" store other offline information. The "buyerlisting" data store the Buyer's content for approved links displays, and "buyerbid" store the Buyer's requirements for minimum click-throughs, speed, and quality, and minimum and maximum bids that would be made or election of automatically making a highest bid. The "bids" data store the bids made by the Buyer, "cblogs" store records of the Buyer's sessions online with ClicksBroker, and "hits" stores the record of Seller's users sessions with ClicksBroker. The "trials" data store records of the Buyer's participation in trials, and "transaction" store records of the Buyer's participation in transactions. The "buyerlink" stores the Buyer's web site information. The "buyeracct" maintains the Buyer's account balance and credit account information. The "clicksbrokerin" records the history of Buyer's payments to ClicksBroker, and other housekeeping data records are also indicated.

FIGS. 7-36 illustrate screen shots of the implementation example of the ClicksBroker site for facilitating buying and selling of click-through traffic between buyers and sellers.

Other Features and Variations

The invention system provides buyers and sellers with an online, interactive exchange or auction facility even without using the trial process. It enables buyers and sellers to engage in bidding for click-through traffic, and then to activate and monitor the performance of the click-through traffic sold in a sale transaction. The seller's click-through traffic remains linked to the intemediary web site so that it can continue to monitor the performance of the click-through traffic sent to the buyer's web site, so that the seller and buyer can be apprised of the performance of the click-through traffic.

Sale relationships with multiple buyers can be established for a seller, such as one having a large web site with many webpages or e-commerce channels, by establishing different aliases for each of the seller's webpages or channels, in order to accommodate multiple relationships at the same time. Each alias is performing as a unique ClicksBroker account. All metrics are collected for each alias, and the combined results can be presented to the seller for all of the individual aliases.

The relationship between buyers and sellers can be extended by adding other parameters, such as one called a "clicks package", which is the number of clicks buyer is committed to buying and which the seller (with a large number of visitors) has obligation to deliver within a certain amount of time. The seller can add more of the buyer's links, or remove them from the webpages, in order to accommodate a required speed of delivery to fulfill the clicks package parameters. Alternatively, ClicksBroker can automatically show more buyer's ad messages at more links on the seller's website. That would enable the buyer and seller to have a relationship where the number of clicks can be bought as a package, and not as a temporary relationship that can be stopped at any moment by each party in the typical sale process.

If suitable for certain types of Internet advertising or market segments, the click-through traffic buying/selling system can also be implemented in a "reverse auction" model in which a buyer offers to purchase click-through traffic of specified parameters from any interested sellers. Similar trial, bidding, and sale processes as described above can be adapted to the reverse auction model, with "sellers" and "buyers" in reversed roles.

As another feature, the IWS can enable a seller with a multi-page or multi-channel web site to conduct multiple trials each with selected buyers simultaneously, by using Seller subdesignations or aliases and establishing links between selected buyer and a corresponding page or channel of the web site. This extension of the click-through buying/selling system may be particularly suitable for large aggregated web sites, such as Amazon.com or Yahoo, which offer many different categories of products or have many different channels of user interest.

The preferred IWS implementation employs a business model in which the IWS acts as a "ClicksBroker" putting buyers and sellers together and facilitating their trials, bidding, and sale transactions, and earning a commission percentage from the resulting click-through traffic generated, such as a percentage of the price paid by a buyer for each click-through from a seller. This business model is considered attractive to click-through sellers and buyers because a commission is earned only when click-through traffic is delivered. However, it is to be understood that other business models may be employed, such as the advertising and media placement model in which a percentage is earned on a lump sum price paid by the buyer or earned by the seller upon the placement of each sale transaction. By providing real-time metrics on the performance of their click-through transactions, and by retaining databases of seller and buyer transactions and histories, the IWS provides a strong incentive for participants to continuously visit the IWS site and confirm existing click-through transactions or enter into new transactions.

It is to be understood that many modifications and variations may be devised given the above description of the principles of the invention. It is intended that all such modifications and variations be considered as within the spirit and scope of this invention, as defined in the following claims.

The invention claimed is:

1. A method for buying and selling of click-through traffic from a seller's web site comprising the steps of:
   (a) registering a plurality of buyers interested in buying click-through traffic of visitors to the seller's web site;
   (b) establishing a link from the seller's web site to an intermediary web site, and storing respective links to the plurality of interested buyers' web sites at the intermediary web site, wherein the respective link to each respective buyer's web site can be addressed through the intermediary web site by a corresponding buyer-specific link displayed on the seller's web site during a trial period to be conducted with each corresponding buyer;
   (c) conducting a pre-bidding trial of click-through traffic from the seller's web site with the plurality of interested buyers by linking the seller's web site through the intermediary web site to each interested buyer's web site in turn during a given trial period so that each buyer can assess what click-through traffic they will receive from the seller's web site;
   (d) conducting a bidding process after the trial period is concluded, in which the interested buyers who participated in the pre-bidding trial can then bid a price each is willing to pay to obtain the click-through traffic from the seller's web site; and
   (e) enabling the seller to select a winning bid of a buyer in the bidding process in order to conclude a sale of the right to obtain the click-through traffic from the seller's web site to the winning buyer's web site.

2. A method according to claim 1, wherein the link from the seller's web site is enabled by a links code pasted in a given links area on the seller's web site page which points to an addressable file at the intermediary web site storing a buyer's link content, for retrieving the link content and displaying it in the corresponding links area on the seller's web site page.

3. A method according to claim 2, wherein said links code and displayed link content are operative to enable the sending of a click-through message to the intermediary web site when a visitor clicks on the links area of the seller's web site page.

4. A method according to claim 1, wherein a code page is inserted in a buyer's web site page for sending clicks messages to the intermediary web site representing the visitor's clicks on the buyer's web site page.

5. A method according to claim 1, wherein the intermediary web site contains a tracking component that tracks and records data on the click-through traffic linked to the intermediary web site.

6. A method according to claim 1, wherein the intermediary web site enables a buyer to conduct trials with more than one seller simultaneously.

7. A method according to claim 1, wherein the intermediary web site enables buyers and sellers to elect whether to conduct the trial process automatically or manually.

8. A method according to claim 1, wherein the intermediary web site enables buyers and sellers to elect whether to conduct the bidding process automatically or manually.

9. A method according to claim 1, wherein the intermediary web site enables buyers and sellers to elect whether to conduct a trial process for an exchange of click-through traffic between each clicks sender and clicks receiver reciprocally.

10. A method according to claim 1, wherein the intermediary web site enables buyers and sellers to conduct a direct sale of click-through traffic without a trial.

11. A method according to claim 1, wherein after the seller has selected the winning buyer and a sale transaction is concluded, the intermediary web site operates to measure the click-through traffic sent from the seller's web site to the winning buyer's web site during a sale process.

12. A method according to claim 1, wherein the intermediary web site enables either the seller or buyer to terminate the sale process if the sale relationship does not meet their requirements.

13. A method according to claim 1, wherein the intermediary web site enables a seller with multiple pages or multiple channels on its web site to conduct multiple trials for the click-through traffic from the respective pages or channels with selected buyers simultaneously.

14. A method according to claim 1, wherein the intermediary web site enables buyers and sellers to conduct a reverse auction process, in which a buyer can offer to purchase click-through traffic of specified parameters to a number of interested sellers, and said first, second, third, and fourth facilities are operated with the buyers and sellers roles defined in reverse.

15. A method according to claim 1, wherein the intermediary web site enables buyers and sellers to conduct a bidding process for click-through traffic generated by a plurality of links on the seller's web site grouped together as a clicks package.

16. A method according to claim 1, wherein the intermediary web site charges a commission for each click of the click-through traffic sent from the seller's web site to the winning buyer's web site during a sale process.

17. A method according to claim 1, wherein the intermediary web site charges a commission for the conclusion of each sale of click-through traffic between the seller and the winning buyer.

* * * * *